(12) United States Patent
Vaidyanathan et al.

(10) Patent No.: US 9,811,835 B2
(45) Date of Patent: Nov. 7, 2017

(54) METADATA-ENABLED DYNAMIC UPDATES OF ONLINE ADVERTISEMENTS

(75) Inventors: Shankar Vaidyanathan, Sammamish, WA (US); Balbir Singh, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 405 days.

(21) Appl. No.: 12/818,799

(22) Filed: Jun. 18, 2010

(65) Prior Publication Data

US 2011/0313848 A1  Dec. 22, 2011

(51) Int. Cl.
G06Q 30/00 (2012.01)
G06Q 30/02 (2012.01)

(52) U.S. Cl.
CPC ......... *G06Q 30/02* (2013.01); *G06Q 30/0244* (2013.01); *G06Q 30/0276* (2013.01); *G06Q 30/0277* (2013.01)

(58) Field of Classification Search
CPC ........ G06F 9/4428–9/4435; G06F 8/24; G06F 8/315
USPC .............. 705/14.43; 717/108, 165, 322, 116; 379/201.03; 710/332; 719/315
See application file for complete search history.

(56) References Cited

U.S. PATENT DOCUMENTS

| | | | | |
|---|---|---|---|---|
| 5,818,444 | A * | 10/1998 | Alimpich et al. | 715/765 |
| 5,991,735 | A * | 11/1999 | Gerace | 705/7.33 |
| 6,151,584 | A | 11/2000 | Papierniak | |
| 6,173,286 | B1 * | 1/2001 | Guttman et al. | 715/234 |
| 6,230,159 | B1 * | 5/2001 | Golde | |
| 6,233,730 | B1 * | 5/2001 | Todd et al. | 717/108 |
| 6,732,331 | B1 * | 5/2004 | Alexander | 715/234 |
| 6,813,746 | B1 * | 11/2004 | O'Shea | 715/234 |
| 6,925,649 | B2 | 8/2005 | Schwalb | |
| 6,928,610 | B2 * | 8/2005 | Brintzenhofe et al. | 715/202 |
| 7,043,311 | B2 * | 5/2006 | Nixon | G05B 19/4188 700/28 |
| 7,313,575 | B2 * | 12/2007 | Carr et al. | |
| 7,415,483 | B2 * | 8/2008 | Kuntz-Mayr et al. | |
| 7,596,561 | B2 * | 9/2009 | Farmer | |

(Continued)

OTHER PUBLICATIONS

Wang, Xin-Jing, et al., "Argo: Intelligent Advertising by Mining a User's Interest from His Photo Collections", Jun. 28, 2009, 9 pages, Paris, France, http://research.microsoft.com/en-us/people/xjwang/argo_wangyuzhang_.pdf.

(Continued)

*Primary Examiner* — Bennett Sigmond
(74) *Attorney, Agent, or Firm* — Shook, Hardy & Bacon L.L.P.

(57) ABSTRACT

Systems, methods, and computer media for dynamically updating online advertisements and providing updated online advertisements are provided. An object-oriented online advertisement is provided that has properties inherited from an advertisement class. The inherited properties include metadata fields and corresponding metadata values. The metadata fields and values determine the content, appearance, behavior, and other characteristics of the online advertisement when it is published on a web page. Changes to or addition or deletion of metadata fields and values in an advertisement class or subclass are communicated to the online advertisements, and the metadata of the advertisements are updated to reflect the changes.

20 Claims, 7 Drawing Sheets

(56) References Cited

U.S. PATENT DOCUMENTS

| | | | | |
|---|---|---|---|---|
| 7,908,663 | B2* | 3/2011 | Horvitz | G06Q 10/10 380/255 |
| 8,271,507 | B2* | 9/2012 | Farmer | 707/756 |
| 2002/0120596 | A1* | 8/2002 | Gershoff et al. | 707/1 |
| 2002/0184233 | A1* | 12/2002 | Schneider | 707/104.1 |
| 2004/0006765 | A1* | 1/2004 | Goldman | 717/116 |
| 2004/0181544 | A1* | 9/2004 | Anderson | 707/102 |
| 2004/0230983 | A1* | 11/2004 | Shi et al. | 719/310 |
| 2005/0027377 | A1* | 2/2005 | Lucas | G05B 19/41845 700/28 |
| 2005/0060229 | A1 | 3/2005 | Riedl | |
| 2006/0029093 | A1 | 2/2006 | Van Rossum | |
| 2006/0173744 | A1* | 8/2006 | Kandasamy et al. | 705/14 |
| 2006/0179453 | A1 | 8/2006 | Kadie | |
| 2007/0180470 | A1* | 8/2007 | Gill et al. | 725/52 |
| 2007/0233566 | A1* | 10/2007 | Zlotin | G06Q 30/02 705/14.41 |
| 2008/0046924 | A1 | 2/2008 | Hood | |
| 2008/0140476 | A1* | 6/2008 | Anand et al. | 705/7 |
| 2008/0140524 | A1* | 6/2008 | Anand et al. | 705/14 |
| 2008/0147487 | A1* | 6/2008 | Hirshberg | 705/10 |
| 2008/0162548 | A1* | 7/2008 | Ahmed et al. | 707/103 R |
| 2008/0189303 | A1* | 8/2008 | Bush et al. | 707/100 |
| 2009/0089161 | A1* | 4/2009 | Ali et al. | 705/14 |
| 2009/0106234 | A1* | 4/2009 | Siedlecki et al. | 707/5 |
| 2009/0164312 | A1* | 6/2009 | Nadig | 705/14 |
| 2010/0005001 | A1* | 1/2010 | Aizen et al. | 705/14.73 |
| 2010/0082411 | A1* | 4/2010 | Goyal | G06Q 30/0241 705/14.4 |
| 2010/0114706 | A1* | 5/2010 | Kosuru | 705/14.55 |
| 2011/0029879 | A1* | 2/2011 | Calvin | 715/733 |
| 2011/0082719 | A1* | 4/2011 | Dutta | 705/7.29 |

OTHER PUBLICATIONS

Davis, Marc, et al., "From Context to Content: Leveraging Context to Infer Media Metadata", Oct. 10, 2004, 8 pages, New York, New York, USA, http://citeseerx.ist.psu.edu/viewdoc/download? i=10.1.1.70.8830&rep=rep1&type=pdf.

"Google Maps", Retrieved Mar. 3, 2010, 7 pages, http://en.wikipedia.org/wiki/Google_Maps.

"First Office Action and Search Report Issued in Chinese Patent Application No. 201110174252.2", Mailed Date: Aug. 17, 2015, 13 Pages.

* cited by examiner

METADATA-ENABLED DYNAMIC UPDATES OF ONLINE ADVERTISEMENTS

BACKGROUND

Online advertisements are frequently published and displayed on web pages along with web page content to solicit business from viewers of the web pages. Online advertisements are designed by a number of creative entities in a variety of formats and include a variety of information. The lack of a standardized schema for implementing online advertisements impedes advertisement updating, portability, indexing, and searching. Often, an advertiser wishes to change advertising campaign details, prices, landing page URL, and/or other properties of an online advertisement. Updating advertisements after creation is a difficult and non-standardized process using conventional online advertisement structure and conventional advertising systems.

SUMMARY

Embodiments of the present invention relate systems, methods, and computer-readable media for dynamically updating online advertisements and providing updated online advertisements. Using the methods described herein, online advertisements can be dynamically updated through metadata fields and metadata values stored for each metadata field. Online advertisements can be object-oriented and inherit properties, including metadata fields having respective metadata values, from a defined advertisement class. The metadata fields and corresponding metadata values determine the content and appearance of the advertisement when it is published on a web page. After an object-oriented online advertisement is provided, it can be determined that a metadata field or metadata value in the advertisement class, subclass, or instance has changed since the online advertisement was provided. A dynamic update reflecting the change can be provided for the metadata field or value.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The present invention is described in detail below with reference to the attached drawing figures, wherein.

DETAILED DESCRIPTION

Embodiments of the present invention are described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" or "module" etc. might be used herein to connote different components of methods or systems employed, the terms should not be interpreted as implying any particular order among or between various steps herein disclosed unless and except when the order of individual steps is explicitly described.

Embodiments of the present invention provide systems, methods, and computer-readable storage media for dynamically updating online advertisements and publishing updated online advertisements. In accordance with embodiments of the present invention, an object-oriented online advertisement is provided that has properties inherited from an advertisement class. The inherited properties include metadata fields and corresponding metadata values. The metadata fields and values determine the content, appearance, behavior, and other characteristics of the online advertisement when it is published on a web page. Metadata values may change over time to reflect new or updated product information, prices, advertising strategies, campaigns, availability, and the like. Additionally, new metadata fields may be added to an online advertisement or advertisement class after creation. Changes to metadata fields and values may be made, for instance, by advertisers, publishers, the advertising system, and even consumers.

In one embodiment, when changes are made to the metadata in the advertisement class or subclass, updates are dynamically communicated to the advertisement such that the online advertisement will contain the most recent information. This allows changes in price, product information, product availability, advertising strategy, advertising campaign, awards, landing page URL, offer lifetime, relative value, etc., to be communicated as they occur and saves the inconvenience, delay, and cost of redesigning advertisements.

In another embodiment, metadata values for one or more metadata fields are retrieved immediately before the online advertisement is published on a web page. Retrieval immediately before display provides a dynamic advertisement that is always published with the most current information. In some embodiments, metadata fields and values are stored in a computing cloud.

Figure 1:
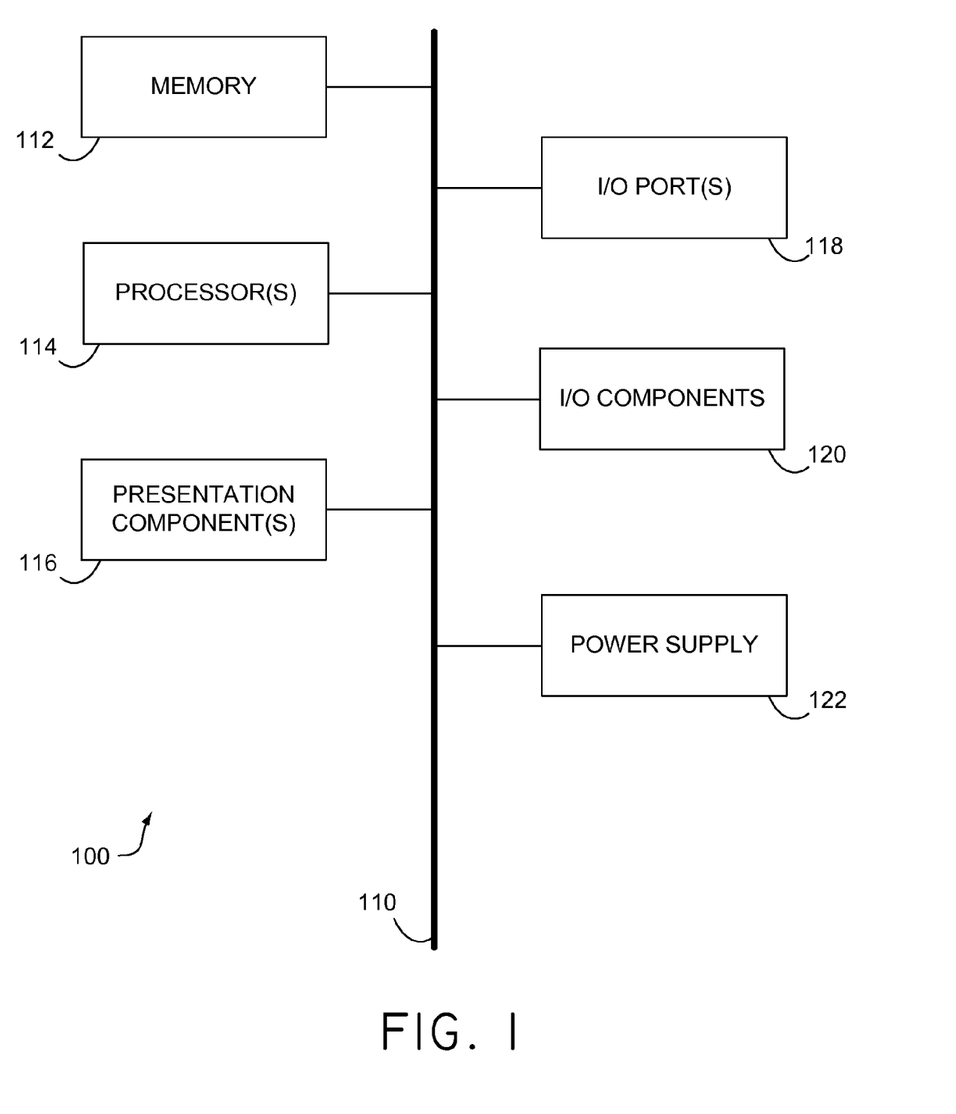
FIG. 1 is a block diagram of an exemplary computing environment suitable for use in implementing embodiments of the present invention.

Having briefly described an overview of some embodiments of the present invention, an exemplary operating environment in which embodiments of the present invention may be implemented is described below in order to provide a general context for various aspects of the present invention. Referring initially to FIG. 1 in particular, an exemplary operating environment for implementing embodiments of the present invention is shown and designated generally as computing device 100. The computing device 100 is but one example of a suitable computing environment and is not intended to suggest any limitation as to the scope of use or functionality of embodiments of the present invention. Neither should the computing device 100 be interpreted as having any dependency or requirement relating to any one or combination of components illustrated.

Embodiments of the present invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. Embodiments of the present invention may be practiced in a variety of system configurations, including hand-held devices, consumer electronics, general-purpose computers, more specialty computing devices, and the like. Embodiments of the present invention may also be practiced in distributed computing environments where tasks are performed by remote-processing devices that are linked through a communications network.

With continued reference to FIG. 1, the computing device 100 includes a bus 110 that directly or indirectly couples the following devices: a memory 112, one or more processors 114, one or more presentation components 116, input/output (I/O) ports 118, I/O components 120, and an illustrative power supply 122. The bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

The computing device 100 typically includes a variety of computer-readable media. Computer-readable media can be any available media that can be accessed by the computing device 100 and includes both volatile and nonvolatile media, removable and non-removable media. By way of example, and not limitation, computer-readable media may comprise computer storage media. Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 100.

The memory 112 includes computer-storage media in the form of volatile and/or nonvolatile memory. The memory may be removable, non-removable, or a combination thereof. Exemplary hardware devices include solid-state memory, hard drives, optical-disc drives, etc. The computing device 100 includes one or more processors that read data from various entities such as the memory 112 or the I/O components 120. The presentation component(s) 116 present data indications to a user or other device. Exemplary presentation components include a display device, speaker, printing component, vibrating component, etc.

The I/O ports 118 allow the computing device 100 to be logically coupled to other devices including the I/O components 120, some of which may be built in. Illustrative components include a microphone, joystick, game pad, satellite dish, scanner, printer, wireless device, etc.

As discussed previously, embodiments of the present invention provide methods and computer-readable storage media for dynamically updating online advertisements and publishing updated online advertisements. Embodiments of the invention will be discussed in greater detail with reference to FIGS. 2-8.

Figure 2:
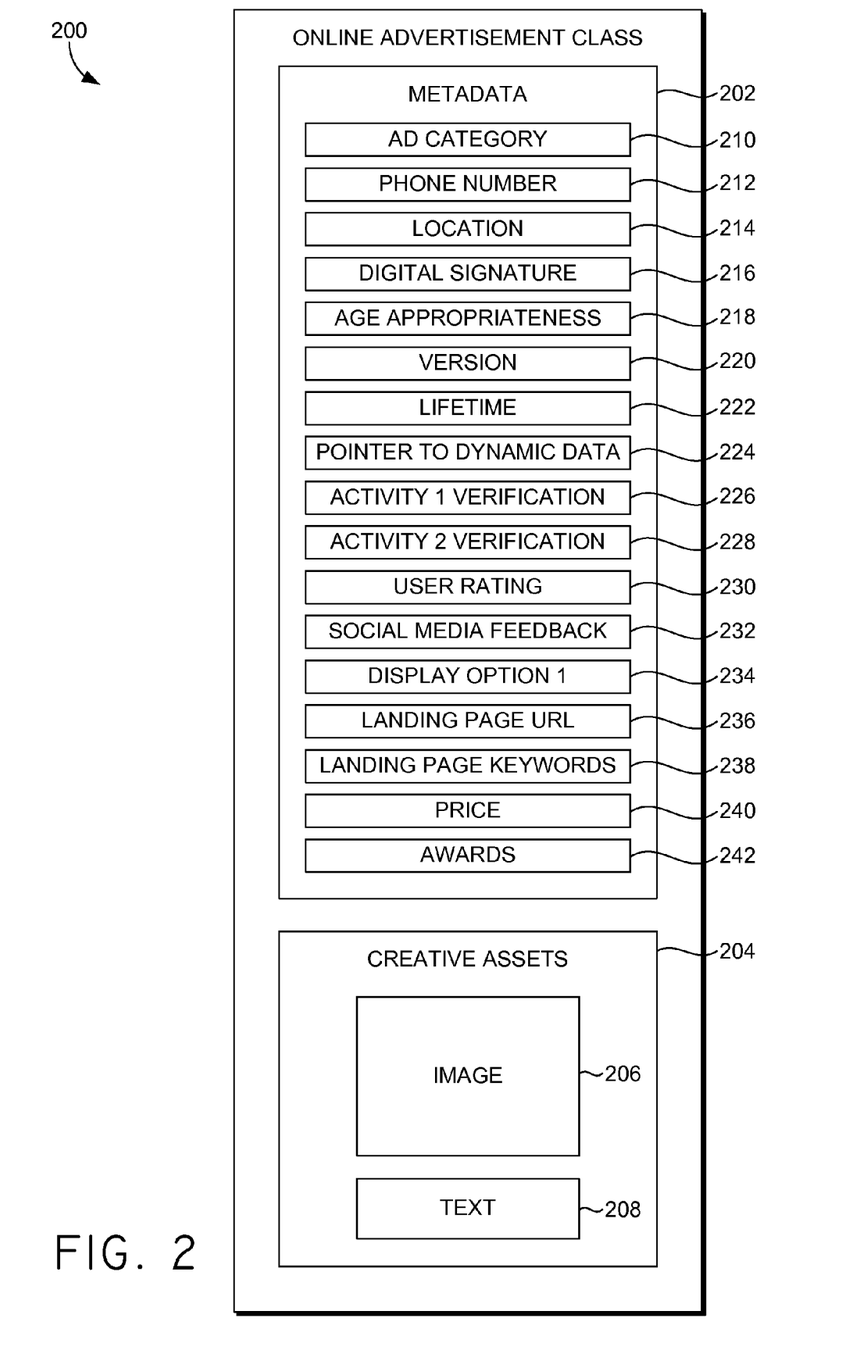
FIG. 2 is a block diagram of an exemplary online advertisement class having metadata fields, in accordance with an embodiment of the present invention.

FIG. 2 illustrates a block diagram of an online advertisement class 200 having metadata 202 according to an embodiment of the present invention. The illustrated online advertisement class 200 also includes creative assets 204. Metadata are typically thought of as "data about data." In FIG. 2, the metadata 202 describe the characteristics of the online advertisement class 200. Information regarding the characteristics of an online advertisement class can be used to enable a variety of features and provide an enhanced online advertising experience for both an advertiser and a consumer. The creative assets 204 are the parts of the online advertisement class 200 that convey a message about a particular product or service to a consumer viewing the ads and may include an image 206 and text 208. Conventional online advertisements include creative assets but do not include metadata.

The metadata 202 enable an object-oriented approach to creating online advertisements. In an object-oriented approach, one or more advertisement "classes," such as online advertisement class 200, are created. The class defines general characteristics that may be "inherited" by "sub-classes" or "instances" of the class. Object-orientedness is a well-known concept to one having ordinary skill in the art. An instance of online advertisement class 200 is a particular online advertisement, such as the online advertisement 300 illustrated in FIG. 3. In FIG. 2, metadata fields, such as metadata field 210, are the general characteristics inherited by instances of the advertisement class 200. An object-oriented structure allows online advertisements to be created and updated quickly and consistently. The metadata may be incorporated into or associated with an online advertisement in a number of ways. In FIG. 2, the metadata 202 are shown in a table form for explanatory purposes. In some embodiments, metadata are incorporated into an online advertisement via eXtensible Markup Language (XML) prior to the advertisement being published on a web page. Various ways of formatting, storing, incorporating, and/or associating metadata are well known in the art.

The metadata 202 includes exemplary metadata fields 210, 212, 214, 216, 218, 220, 222, 224, 226, 228, 230, 232, 234, 236, 238, 240, and 242. The metadata fields define a type or category of information for which specific metadata values are determined for individual advertisements that are instances of the advertisement class 200. For example, metadata field 210 is defined as "AD CATEGORY." Possible metadata values for metadata field 210 include "electronics," "home improvement," "finance," "computers," "sporting goods," "food products," etc. The metadata fields may be defined when the online advertisement class 200 is created, but metadata fields may also be added or deleted after creation. Each instance of online advertisement class 200, such as the illustrated online advertisement 300 in FIG. 3, will have a specific metadata value for each metadata field 210. The online advertisement 300 has a metadata value 310 of "electronics" for metadata field 210 defined as "AD CATEGORY." A particular embodiment of the invention may include any one or combination of the metadata fields included in the metadata 202, or other metadata fields not shown in FIG. 2.

Figure 3:
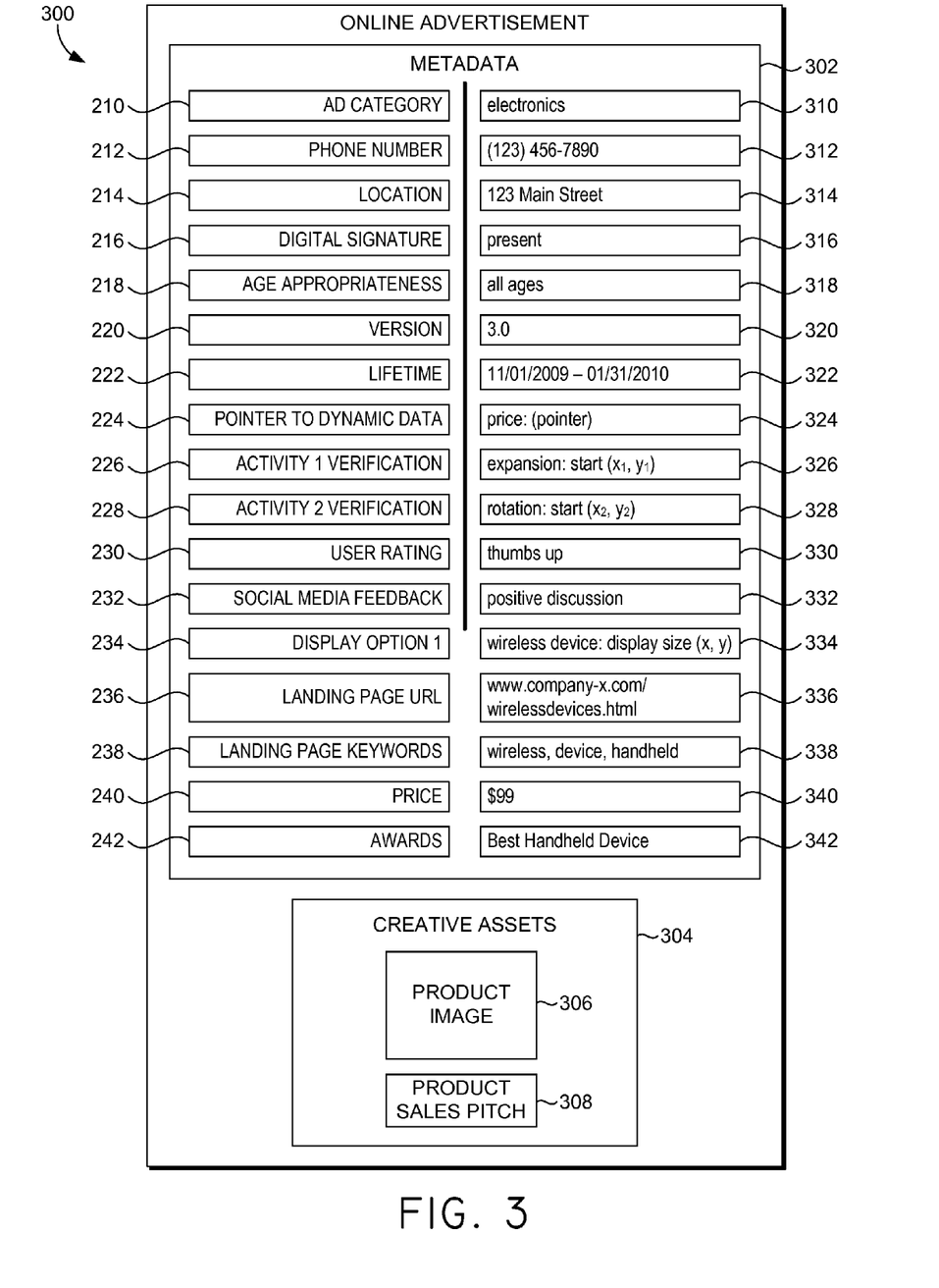
FIG. 3 is a block diagram of an exemplary online advertisement that is an instance of an online advertisement class and has inherited metadata fields and corresponding metadata values, in accordance with an embodiment of the present invention.

FIG. 3 illustrates an online advertisement 300, which is an instance of online advertisement class 200 in FIG. 2. The online advertisement 300 comprises metadata 302 and creative assets 304, including a product image 306 and product sales pitch 308. Each of the metadata fields 210, 212, 214, 216, 218, 220, 222, 224, 226, 228, 230, 232, 234, 236, 238, 240, and 242, has a corresponding metadata value 310, 312, 314, 316, 318, 320, 322, 324, 326, 328, 330, 332, 334, 336, 338, 340, and 342.

Metadata field 210 is defined as "AD CATEGORY," and the corresponding metadata value 310 is "electronics." Metadata field 210 provides information about what type of product the advertisement describes. For the illustrated online advertisement 300, the product is categorized as electronics. AD CATEGORY information can be used, among other things, to quickly search, retrieve, and/or display online advertisements related to a particular category. Further, if a user clicks on the illustrated online advertisement 300, the advertiser may infer that the user would be interested in additional advertisements of the same AD CATEGORY (i.e., advertisements for other electronics items). Possible metadata values for metadata field 210 may be pre-defined categories that an advertiser selects when a particular online advertisement is created. In some embodiments, an advertiser may create a previously undefined metadata value for metadata field 210.

Metadata field 212 is defined as "PHONE NUMBER." The corresponding metadata value 312 is "(123) 456-7890." Values for metadata field 212 indicate a contact telephone number with which a user viewing the illustrated online advertisement 300 can contact the advertiser. Metadata value 312 may be displayed with or on the online advertisement or may be accessed by a user in a number of ways including hovering or right-clicking. The phone number shown as metadata value 312 may be a toll-free number, a general corporate number, or the number for the nearest location affiliated with the advertiser or that carries the advertiser's products.

Similarly, metadata field 214 is defined as "LOCATION." The corresponding metadata value 314 is "123 Main Street." Values for metadata field 214 indicate a business location affiliated with the advertiser who placed the illustrated online advertisement 300. Metadata value 314 may be displayed with or on the online advertisement or may be accessed by a user in a number of ways including hovering or right-clicking. The address shown as metadata value 314 may be a corporate headquarters, affiliated retailer, or the nearest branch, location, or franchise affiliated with the advertiser or that carries the advertiser's products.

Metadata field 216 is defined as "DIGITAL SIGNATURE." The corresponding metadata value 316 is "present." A digital signature provides a way to verify that an online advertisement or portion of an online advertisement has not been altered between creation and display. Digital signatures typically include a key generated upon creation of the online advertisement and verified before display. Types, creation, and use of digital signatures are well-known in the art. One exemplary digital signature standard is the World Wide Web Consortium (WC3) XML-Signature Syntax and Processing recommendation of Feb. 12, 2002. Metadata value 316 simply indicates the presence of a digital signature. Other metadata values for metadata field 216 are possible. The digital signature itself may be associated with or incorporated into an online advertisement in a number of ways.

Metadata field 218 is defined as "AGE APPROPRIATENESS." The corresponding metadata value 318 is "all ages." Values for metadata field 218 indicate an age range for which creative assets 304 of the illustrated advertisement 300 are appropriate. Values for metadata field 218 may be similar to rating systems used by video game or movie industries. Possible values for metadata field 218 are advertiser-selectable and are typically defined when advertisement class 200 is created. In some embodiments, advertisements are screened or rated by an advertising service or a neutral party to ensure age appropriateness.

Metadata field 220 is defined as "VERSION." The corresponding metadata value 320 is "3.0." Values for metadata field 220 indicate the version of the associated advertisement 300. Oftentimes an advertiser will create an advertisement and make changes to the advertisement over time to reflect new economic conditions, changes in competitors' offerings, or other changes to the marketplace. VERSION allows an advertisement to be quickly examined to determine if the advertisement is the most recent version available. Determining that a version is the most recent version may be accomplished through a number of methods, including by verifying the version with an advertiser. In some embodiments, if the advertisement is not the most recent version available, the advertisement is not displayed. In other embodiments, upon determining that the advertisement is not the most recent version available, the website attempting to display the ad requests the most recent version. This ensures outdated advertisements are not displayed to customers.

Metadata field 222 is defined as "LIFETIME." The corresponding metadata value 322 is "Nov. 1, 2009-Jan. 31, 2010." Values for metadata field 222 indicate a lifetime for which the advertisement is valid. In some embodiments, metadata value 322 is an ending date after which the advertisement should not be displayed. In other embodiments, metadata value 322 includes one or more date ranges for which the advertisement is valid. The lifetime of an advertisement may be limited for a number of reasons, including an advertiser decision to end a promotion or introduce a new model or a contractual arrangement with a website or destination for placing the advertisement. The date range of the illustrated metadata value 322, for example, indicates that the corresponding online advertisement 300 is only authorized for display during the winter holiday season. An advertisement lifetime can be different from the starting and ending date of an advertising campaign. For example, in many cases an advertisement is valid even after an advertising campaign featuring the subject of the advertisement has ended.

Metadata field 224 is defined as "POINTER TO DYNAMIC DATA." The corresponding metadata value 324 is "price: (pointer)." Metadata value 324 may indicate the content of the data pointed to or the pointer itself. Here, "(pointer)" refers to the actual pointer, which is not included for simplicity. Online advertisement 300 may not contain all of the information to be conveyed when the advertisement 300 is placed. Some of the creative assets 304 may be dynamic. For example, an online advertisement may be created before a price has been determined, or the advertiser may anticipate frequent fluctuations in price. In some embodiments, metadata value 324 is a pointer to dynamic data that will be accessed and incorporated into the associated online advertisement 300 before display. In other embodiments, updates may be pushed or pulled periodically or on demand to the online advertisement 300.

Metadata field 226 is defined as "ACTIVITY 1 VERIFICATION." The corresponding metadata value 326 is "expansion: start $(X_1, Y_1)$." Online advertisements incorporate actions or other features beyond static display of creative assets. Typically, these actions or features are incorporated into an online advertisement as code. Determining exactly what will happen when incorporated code is run can be difficult and presents a security risk. Code can be malicious, and "sandboxing" unknown or unverified code can be resource intensive and limit the designed activities of an online advertisement, presenting a sub-optimal advertising experience to a user. Through the use of metadata field 226, code can be verified by an advertising system or neutral party before display and the actions an online advertisement will take upon display can be readily determined upon inspection of metadata value 326. Metadata value 326 is "expansion: start $(X_1, Y_1)$," indicating that the associated online advertisement 300 will expand upon display at starting coordinates $(X_1, Y_1)$. Metadata field 228, defined as "ACTIVITY 2 VERIFICATION" and corresponding metadata value 328, "rotation: start $(X_2, Y_2)$," are another example of activity verification metadata. A particular advertisement class or online advertisement may include a number and variety of activity verification metadata. In one embodiment, an online advertisement adds the phone number associated with the advertisement to a user's mobile phone contact list when the user views the ad from the user's mobile phone.

Metadata field 230 is defined as "USER RATING." The corresponding metadata value 330 is "thumbs up." Metadata field 230 is a type of consumer metadata. Metadata are typically created and controlled by the advertiser or advertising system, but consumer metadata allow the consumer to rate, comment, or suggest things related to the advertisement. Metadata field 230 allows a user to rate an advertisement. Metadata value 330 reflects the user rating, which could include a star-based rating system, thumbs-up or thumbs-down, like or did not like, etc. Metadata value 330 may be pre-set to a favorable or neutral rating when an online advertisement is created. Metadata value 330 may reflect, by way of example only, an average user rating, most recent user rating, or average user rating for a particular demographic. Ratings statistics may be compiled through a number of methods including transmitting a user rating to an advertising system or advertiser each time a rating is performed. Statistics are then updated, and an updated average rating is pushed back to the particular advertisement or instances of the advertisement class. Metadata field 230 enables advertisers to strategically dedicate resources to advertisements that are well-received.

Another consumer metadata is metadata field 232 defined as "SOCIAL MEDIA FEEDBACK" and corresponding metadata value 332 "positive discussion." Advertisements are often discussed through social media web sites. In some cases, consumers find an advertisement interesting or amusing and share the ad with others. In other cases, consumers may find an advertisement offensive, inappropriate, or otherwise view the ad poorly. Information related to discussion occurring through social media sites can be gathered and included as metadata. Any number of ways of quantifying social media feedback and incorporating the feedback into metadata are contemplated. Additional consumer metadata are contemplated.

Metadata field 234 is defined as "DISPLAY OPTION 1." The corresponding metadata field 334 is "wireless device: display size (X, Y)." The Internet can be accessed from a variety of devices. Any particular online advertisement might be appropriate or effective when viewed on one device, such as a home computer, while being difficult to understand or view on a different device, such as a wireless phone or other wireless device with a viewing screen substantially smaller than a typical home computer monitor. A variety of display options may be provided for in metadata 202 for advertisement class 200. Each instance of the advertisement class 200, such as online advertisement 300, may include one or more display options to provide device-optimized presentation. For example, metadata value 334 provides display dimensions for displaying online advertisement 300 on a wireless device. Additional metadata fields may describe content to eliminate or add depending on the display device or may specify a different version of the online advertisement to download or present.

Metadata field 236 is defined as "LANDING PAGE URL." The corresponding metadata value 336 is "www-.company_x.com/wirelessdevices.html." (A fictitious URL for illustrative purposes.) An advantage of online advertisements over conventional advertisements is that if a consumer is interested in the advertised product, the consumer can simply click on the ad and navigate to the website of the company selling the product. The landing page URL (uniform resource locator) is the web address of the web page providing information on or selling a product. In FIG. 3, the product advertised in the illustrated advertisement 300 is presented in greater detail at the web address specified by metadata value 336.

Metadata field 238 is defined as "LANDING PAGE KEYWORDS." The corresponding metadata value 336 is "wireless, device, handheld." In some advertising systems, after an online advertisement is created and a landing page URL is specified, the system will analyze the landing page and identify associated keywords. For the landing page specified in the illustrated online advertisement 300, the identified keywords are "wireless," "device," and "handheld." Identification of associated keywords may be used for a variety of purposes, including helping the system identify related advertisements to publish in conjunction with the advertisement 300.

Metadata field 240 is defined as "PRICE." The corresponding metadata value 340 is "$99." Metadata value 224 and corresponding metadata field 324 identified a pointer to price, which was contemplated to be dynamic. The price of an item may also be implemented as in metadata field 240 and value 340. If such embodiments, if the price of the item changes, an update is received for value 340. In other embodiments, both a PRICE metadata and a dynamic pointer are included, PRICE reflecting a default price to be used in the absence of a pointed-to price.

Metadata field 242 is defined as "AWARDS." The corresponding metadata value 342 is "Best Handheld Device." AWARDS metadata reflects industry or consumer review praise that a product may receive. In some embodiments, a product has received an award before an advertisement is created, and this fact can be included in the associated product sales pitch 308. In other embodiments, the product sales pitch 308 is designed to access and incorporate an award if one is received. Upon receipt of an award, a value may be added for metadata value 342 if the metadata field is present, or metadata field 242 and corresponding value 342 may be added to the associated online advertisement 300 if they were previously not present in advertisement 300.

As discussed above, online advertisement metadata may be implemented in XML. XML is frequently used to specify the content and behavior of online advertisements. The following exemplary XML online advertisement illustrates some information typically specified for online advertisements as well as XML implementation of the LOCATION metadata field 214.

In some embodiments, product sales pitch 308 accesses metadata, such as metadata field 240 defined as "PRICE," and incorporates the corresponding value 340 of "$99" into product sales pitch 308. This allows the product sales pitch 308 to dynamically reflect updates to metadata value 340 when the price of an advertised item has changed. Similarly, metadata field 242 defined as "AWARDS" and the corresponding metadata value 342 of "Best Handheld Device," can be accessed and incorporated into the product sales pitch 308. Other metadata fields and values, such as LIFETIME 222 and corresponding metadata value 322, as well as other fields and values not shown, could similarly be accessed and incorporated into the product sales pitch 308. This allows the product sales pitch 308 to dynamically reflect updates to the

```
<ad>
    </AdProperties>
        <Author>Company_A</Author>
        <Company>Company_A</Company>
        <Publisher>Ad_Provider</Publisher>
        <Version>3.00</Version>
        <Ad Id="BSS003" />
        <Signature xmlns="http://www.w3.org/2000/09/xmldsig#">...</Signature>
    </AdProperties>
    <Assets>
        <Asset type="image/jpeg" id="1" src="http:// ad_provider.com/ads/88712.jpg">
        <Parameter name="Height" value="50" />
        <Parameter name="Width" value="640" />
    </Asset>
    <Views>
        <View Orientation = "Landscape" type= "image">
            <Asset name="img" id="1">
            <Parameter name="Type" value="Thumbnail" />
            </Asset>
            <Asset name="img" id="2">
            <Parameter name="Type" value="Full" />
            </Asset>
            <Event name="click" id="3" />
            <Event name="impression" id="1" />
            <Event name="impression" id="2" />
        </View>
    </Views>
    <AdData>
        <XmlDataSrource Id = "LOCATION" Type= "inline">
            <Location>
                <title>Company_A</title>
                <Latitude>...</Latitude>
                <Longitude>...</Longitude>
                <Address type="US">123 Main Street</Address>
            </Location>
        </XmlDataSrource>
    </AdData>
</ad>
```

In the simplified XML advertisement above, the online advertisement author, company, digital signature, and version are specified. Online advertisement creative assets, such as image 88712.jpg, and a view orientation are also specified. Digital signature, author, version, and company information are incorporated above in a conventional manner. Online advertisement metadata, such as metadata 202 of FIG. 2 and 302 of FIG. 3 are incorporated above under "AdData." The LOCATION metadata field has a metadata value "123 Main Street," as illustrated by metadata field 214 and metadata value 314 of FIG. 3. Each of the metadata fields in FIGS. 2 and 3, and corresponding metadata values in FIG. 3 can be implemented in XML similarly to LOCATION above. The schema for how online advertisements are specified as well as the schema for how each metadata field is implemented may be any of a variety of schemas. Widespread adoption of a common schema, in whatever particular form, will facilitate use of advertising metadata to enhance the online advertising experience.

metadata values 340 and 342 when the price of an advertised item has changed, a new award is received for the item, or a sales event is extended. Other metadata accessed by the sales pitch 308 could include metadata describing a certain number of items remaining that are available for sale, related coupons, new discounts, etc. In some embodiments, metadata could be included that specify a relative price or value such as "20% faster than product y." Thus, as competitor products launch or are tested, relative price or value can be dynamically incorporated into the online advertisement.

Each metadata field and corresponding value can be thought of as a "property" of the online advertisement. These properties can be conceptually grouped by type into "property bags." For example, many properties (metadata fields plus values) relate to how an online advertisement is rendered and displayed. Other properties may relate to internal aspects of the advertisement that are considered by the advertising system with which the advertisement is created and/or supplied but may not affect rendering. Still other properties may relate to consumer feedback or advertiser campaign. Some properties may be grouped into multiple property bags. The implementation of indicating that a particular property is part of a property bag may be performed in a number of ways known to one having ordinary skill in the art.

Figure 4:
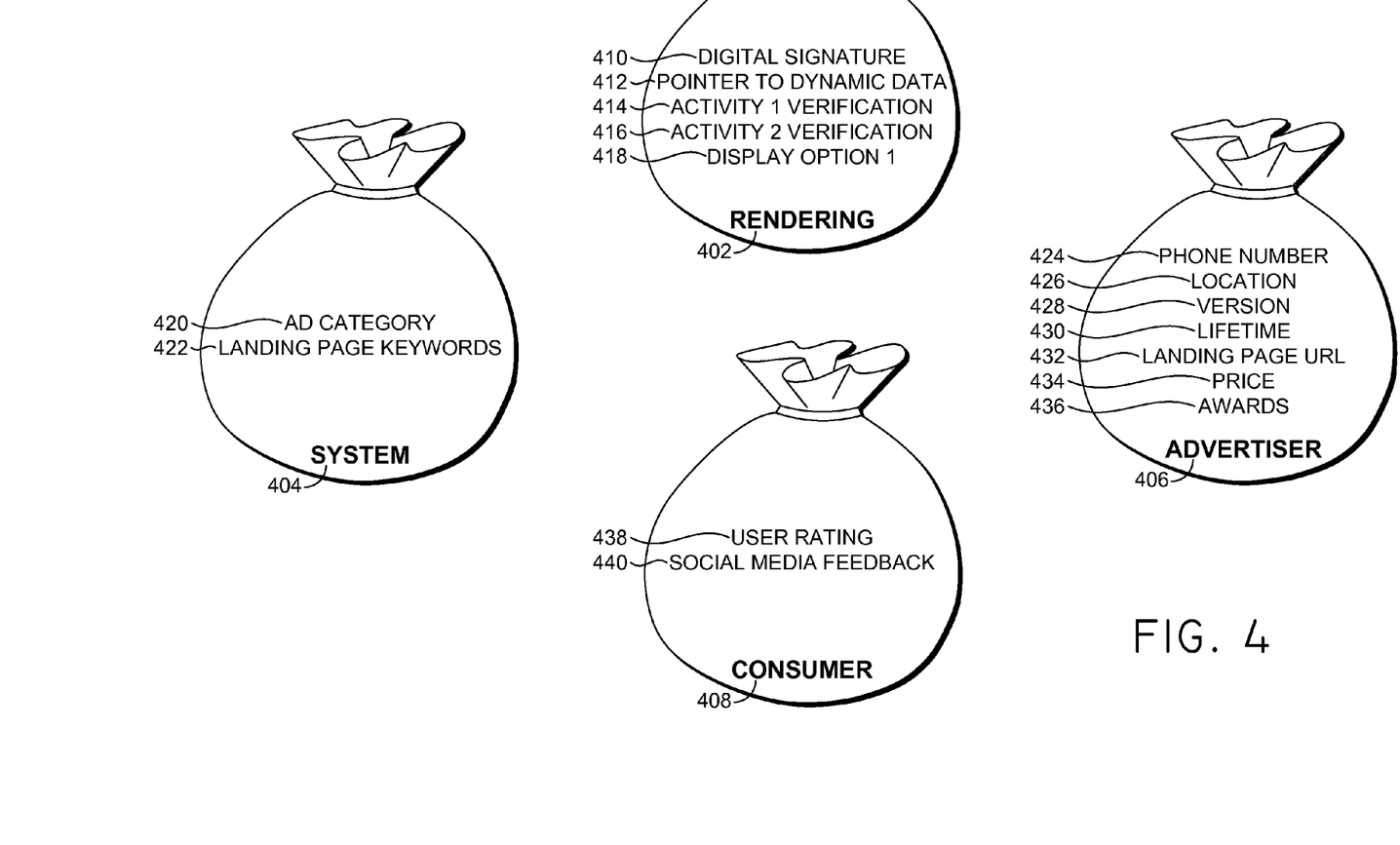
FIG. 4 is a block diagram showing properties conceptually organized into property "bags," in accordance with an embodiment of the present invention.

FIG. 4 illustrates property bags 402, 404, 406, and 408 grouping the properties illustrated in FIGS. 2 and 3. RENDERING property bag 402 includes properties 410—DIGITAL SIGNATURE, 412—POINTER TO DYNAMIC DATA, 414—ACTIVITY 1 VERIFICATION, 416—ACTIVITY 2 VERIFICATION, and 418—DISPLAY OPTION 1. Properties 410, 412, 414, 416, and 418 are discussed above and are all related to how the online advertisement is rendered for publishing on a web page or authenticating the advertisement prior to rendering.

SYSTEM property bag 404 includes properties 420—AD CATEGORY and 422—LANDING PAGE KEYWORDS. Properties 420 and 422 are generated by the advertising system after an advertisement is created and analyzed by the advertising system.

ADVERTISER property bag 406 includes properties 424—PHONE NUMBER, 426—LOCATION, 428—VERSION, 430—LIFETIME, 432—LANDING PAGE URL, 434—PRICE, and 436—AWARDS. Properties 424, 426, 428, 430, 432, 434, and 436 are advertiser-specified properties. These properties are typically under control of the advertiser and would not be determined by the advertising system or other party. In some embodiments, properties (metadata) such as property 434—PRICE and 436—AWARDS are incorporated directly into a creative graphic or image or are included in text accompanying the creative and are not updatable. In other embodiments, the PRICE, AWARDS, etc are stored as properties as shown in FIGS. 2-4 and the advertisement specifies that these properties are accessed and included in the creative when the online advertisement is published. That is, the creative is designed to access and incorporate properties such as the price of the item, availability, end of sales event, awards or recognition received by the item, etc if these properties are available. Thus, updates may be made to properties 434 and 436 without redesigning the advertisement.

CONSUMER property bag 408 includes properties 438—USER RATING and 440—SOCIAL MEDIA FEEDBACK. These properties incorporate consumer feedback and may be used by the system to determine, for example, how often an online advertisement should be displayed, which web pages should display the ad, and to what demographic the ad should be targeted.

Grouping properties into property bags allows various parties in the online advertisement process to focus on and deal with only those properties that are relevant to each party. Additionally, properties in one particular bag may only be available to the relevant party. For example, in some embodiments, advertisers would not have access to the SYSTEM property bag 404.

When an advertiser creates an object-oriented online advertisement class, subclass, or instance, the advertiser defines at least some metadata. Object-oriented online advertisements are extensible; other metadata may be added later, and the class, subclass, or instance can be updated to reflect new metadata fields or values. For example, if Company X is creating an advertising campaign for a wireless device, Company X will likely provide a contact phone number, business location, and other basic information as well as basic creative information. Other metadata can be added later. For example, in some embodiments, the age appropriateness of an online advertisement is determined by a third party. In such a case, an age appropriateness metadata could be added after a rating has been received.

By creating an online advertisement class for advertisements for the wireless device, Company X has created a general template for all advertisements for the device. Subclasses may also be created to alter specific aspects of the advertisement class for regional or local deals or to reflect regional or local competition and/or pricing. Individual instances of the subclasses may be created to target an even more specific audience.

In some embodiments, advertisers may also create an online advertisement class for a brand of products and create subclasses for different products of that brand. For example, Company X may create an online advertisement class for all Company X products that includes general metadata applicable to all Company X products, such as business location, contact phone number, etc. A subclass may then be created for a computer sold by Company X and a second subclass created for a wireless device sold by Company X. In such instances, the class may include metadata values that are overwritten when subclasses are created. For example, a LANDING PAGE URL metadata included with the class may specify the general Company X web page as the landing page for the ad, www.company_x.com. When a subclass is created for advertisements for the wireless device, the metadata value for LANDING PAGE URL is overwritten with www.company_x.com/wirelessdevices.html.

When subclasses are created, new metadata may be added that were not present in the class. For example, the price Company X's products depend upon which product one is interested in. Thus, when the online advertisement class was created, PRICE may not have been included as metadata. A PRICE metadata field and value, such as metadata field 240 and value 340 of FIG. 3 are then created by the advertiser for each particular subclass. In some embodiments, subclasses are created that specify both a geographic region and product.

The object-orientedness of online advertisements enables a variety of functions. One such function is the dynamic updating of advertisements. In many cases, an advertiser would like to make an update to all advertisements in a particular region or for a particular product. A particular online advertisement is an instance of a subclass or class, and each subclass is itself based on another subclass or class. The advertiser can simply update the class or subclass, and the update is communicated to all instances or subclasses of the advertisement. Depending upon the advertiser's preference, updates can be communicated immediately after a change is made, periodically at a defined interval, or upon request by a particular online advertisement. In some embodiments, the metadata for an online advertisement class, subclass, or instance is stored in a computing cloud where it can be accessed for updating.

Figure 5:
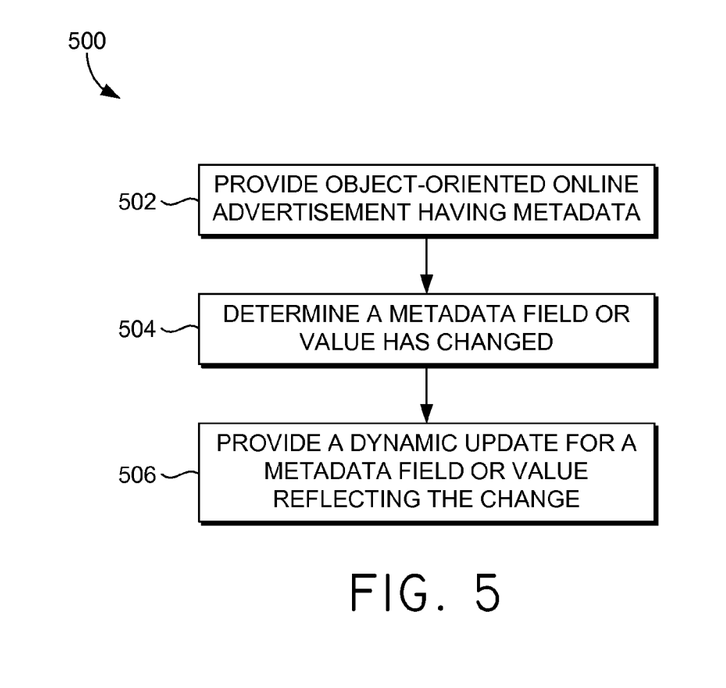
FIG. 5 is a flow chart of an exemplary method for dynamically updating an online advertisement using metadata fields and/or values, in accordance with an embodiment of the present invention.

FIG. 5 illustrates an exemplary method 500 of dynamically updating object-oriented online advertisements using metadata. In step 502, an object-oriented online advertisement having metadata is provided. The provided advertisement is designed to be published on a web page. In step 504, it is determined that a metadata field or value has changed. Step 504 includes actions such as changing a value for an existing field, adding a new field and value, or deleting a field. In step 506, a dynamic update for a metadata field or value is provided reflecting the change. In this way, updates can be dynamically communicated to online advertisements without having to redesign or replace the existing advertisements.

Figure 6:
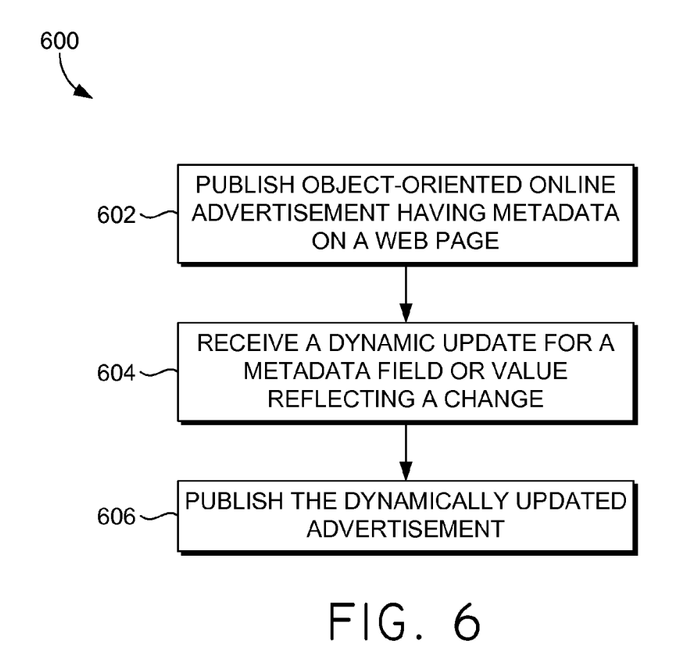
FIG. 6 is a flow chart of an exemplary method for dynamically updating an online advertisement using metadata fields and/or values, in accordance with another embodiment of the present invention.

FIG. 6 illustrates an exemplary method 600 of dynamically updating an object-oriented online advertisement using metadata. In step 602, an object-oriented online advertisement having metadata is published on a web page. In step 604, a dynamic update for a metadata field or value is received, the update reflecting a change made to the metadata field or value. In step 606, the dynamically updated advertisement is published.

Figure 7:
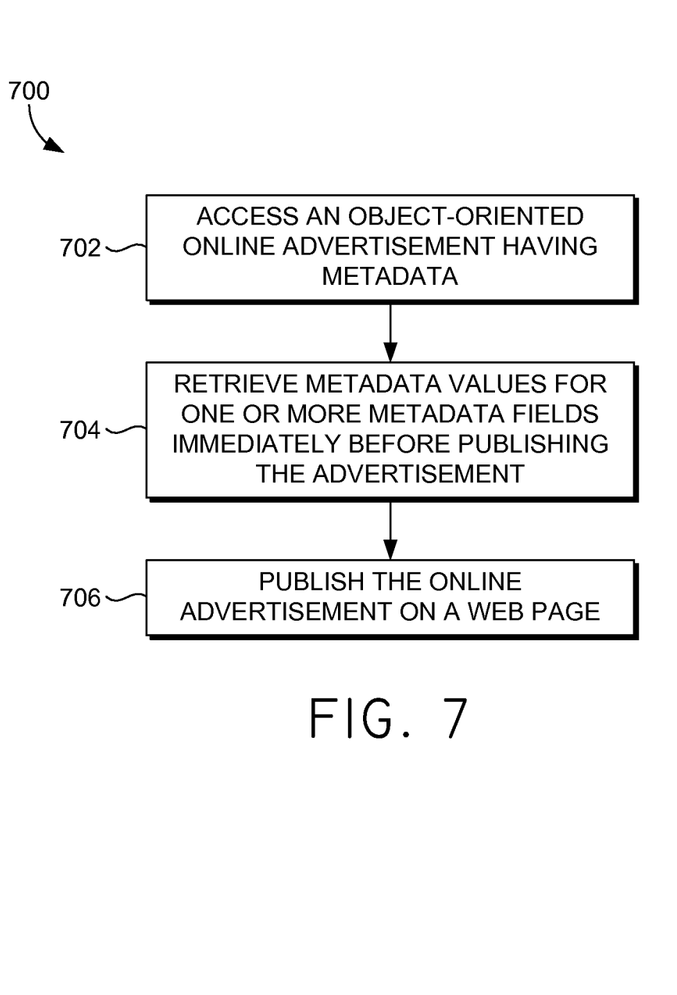
FIG. 7 is a flow chart of an exemplary method for publishing an updated online advertisement, in accordance with an embodiment of the present invention.

FIG. 7 illustrates an exemplary method 700 of publishing an updated object-oriented online advertisement. In step 702, an object-oriented online advertisement having metadata is accessed. In step 704, metadata values for one or more metadata fields are retrieved immediately before publishing the advertisement. In step 706, the online advertisement is published on a web page. Method 700 provides "just-in-time" online advertisements that retrieve some or all metadata values immediately before being published such that the advertisement always reflects the most current information. In some embodiments, metadata values for fields that are determined to be likely to change frequently are retrieved immediately before display and other values are updated only when it is determined a change has been made to the advertisement class or subclass.

Another way the online advertising experience can be enhanced using metadata is to authenticate online advertisements by using the metadata. The inclusion of metadata fields such as AGE APPROPRIATENESS, DIGITAL SIGNATURE, ACTIVITY 1 VERIFICATION, ACTIVITY 2 VERIFICATION, and DISPLAY OPTION 1 as illustrated in FIGS. 2 and 3 allows the content and characteristics of a particular online advertisement to be evaluated before display to a user.

Online advertisement metadata may be incorporated, stored, or associated with an online advertisement in a variety of ways. In the XML example above, a LOCATION metadata field and corresponding metadata value are stored in the advertisement itself. In some embodiments, online advertisement metadata resides in a computing cloud comprising a number of servers or other computer devices. In still further embodiments, metadata are stored in a computing cloud, and some or all metadata fields and corresponding metadata values are downloaded to individual advertisements either at a particular time, such as before display, or periodically. Metadata storage in a cloud also facilitates dynamic updating, as discussed above. If an update is made to the metadata fields in an online advertisement class or a particular subclass or instance of the class, the updates can be made in the computing cloud and pushed to the advertising providers or web pages publishing affected advertisements. In other embodiments, online advertisement classes and instances of the classes contain pointers or links to metadata that are stored exclusively in a computing cloud.

Figure 8:
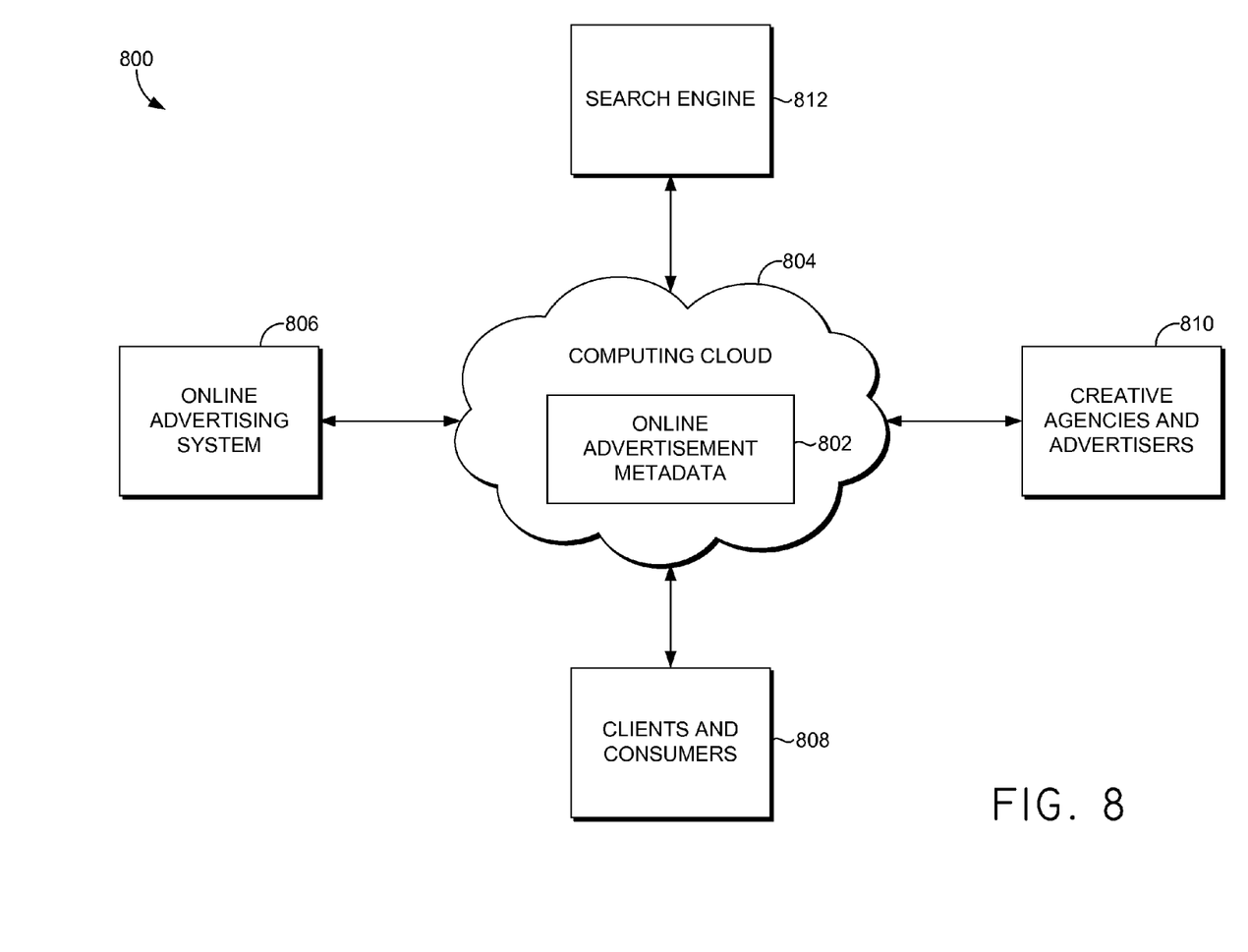
FIG. 8 is a block diagram of an exemplary cloud-based metadata storage and interaction system, in accordance with an embodiment of the present invention.

FIG. 8 is a block diagram of a cloud-based metadata storage and interaction system 800. Online advertisement metadata 802 reside in computing cloud 804. Computing cloud 804 is in communication with one or more online advertising systems 806, clients and consumers 808, creative agencies and advertisers 810, and one or more search engines 812. Computing cloud 804 provides centralized and accessible storage location for metadata 802. Creative agencies and advertisers 810 can directly edit the type and content of metadata after initial creation. Clients and consumers 808 can provide user feedback in the form of user ratings. Clients and consumers 808 can also pull metadata directly from computing cloud 804. Similarly, online advertising system 806 can easily push created metadata to computing cloud 804 and edit previously created metadata. Search engine 812 can also directly access metadata 802 when displaying "search and display" online advertisements based on user Internet keyword queries.

The online advertisement metadata framework described above also provides other opportunities for enhancing the online advertising experience. For example, a common metadata schema allows portability of online advertisements. Online ads can be shared or implemented by a variety of advertising providers or services without reformatting or reprogramming. The metadata framework can also be used to control the frequency of display or distribution of an online advertisement. Consumers do not like viewing the same advertisement many times over a short time period or seeing a particular advertisement everywhere they look. Distribution can be tracked using metadata.

Additionally, an online advertiser can easily substitute creative assets or edit metadata in an online advertisement once the online advertisement class has been created. This can easily be done by, for example, making a change to the information stored in a computing cloud and periodically pushing or pulling the information to existing online advertisements. Further, a standardized metadata schema enables meaningful indexing and crawling of online advertisements. Online ads can be searched according to metadata fields or values specified by a widely adopted schema.

Another online advertising enhancement enabled by the above metadata framework is creative targeting. In many cases, transmitting a user's personal information to a server in order to provide the user with a targeted online advertisement raises security concerns. An online advertisement can contain multiple creative assets described through metadata, each creative asset targeted to a certain demographic. The decision of what creative assets to display can be made on the client side so that no personal information is transmitted to a server.

A standardized metadata framework can also enable a semantic ad web. Online advertisements can be related by the type of product, company, industry, or targeted demographic. Including this information in advertisement metadata allows online advertisements to be displayed to a user that relate to products, companies, or industries in which the user has previously shown interest.

Metadata can also facilitate determining which advertisements are the most popular so that the most popular ads continue to be displayed frequently. As described above in reference to FIGS. 2 and 3, metadata fields and values can be included to allow users to rate online advertisements. In some embodiments, an advertiser may monitor social networking sites, blogs, chat rooms, and/or other forums for information discussing online advertisements that are popular or unpopular. This information can be stored as metadata as illustrated by the SOCIAL MEDIA FEEDBACK metadata of FIGS. 2 and 3 and accessed by an ad server to determine which online advertisements to display.

The metadata framework and authentication process described above can be implemented in "search and display" ads in which advertisers bid on and purchase certain keywords so that when a user performs an Internet keyword query using the purchased keywords, the advertiser's advertisement is displayed. The metadata framework can also be implemented in "display" ads in which an online advertisement is displayed in context, such as an online advertisement placed on a news or weather web page.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and is within the scope of the claims.

Having thus described the invention, what is claimed is:

1. A method in a computer system for dynamically updating online advertisements, the method comprising:
providing an advertisement that is an instance of a defined advertisement class or subclass, wherein the provided advertisement comprises one or more first metadata fields and one or more corresponding first metadata values inherited from one or more second metadata fields and one or more corresponding second metadata values of the defined advertisement class or subclass, wherein the one or more first metadata fields and the one or more corresponding first metadata values of the provided advertisement determine content and appearance of the provided advertisement when published on a web page, wherein each of the one or more first metadata fields and a corresponding one of the one or more corresponding first metadata values comprises a property of the provided advertisement, and wherein each property of the provided advertisement is grouped into one or more property groups, and wherein metadata is implemented in an extensible markup language (XML);
after providing the advertisement, changing at least one of the one or more second metadata fields and a corresponding one of the one or more corresponding second metadata values of the defined advertisement class or subclass; and
based on the change of at least one of the one or more second metadata fields and the corresponding metadata value of the defined advertisement class or subclass, updating at least one of the one or more first metadata fields and a corresponding one of the one or more corresponding first metadata values of the provided advertisement to match the change of the at least one of the one or more second metadata fields and the corresponding metadata value of the defined advertisement class or subclass, wherein the at least one of the one or more first metadata fields and a corresponding one of the one or more corresponding first metadata values is updated without having to redesign or replace the provided advertisement.

2. The method of claim 1, wherein the metadata values are stored in a computing cloud.

3. The method of claim 1, wherein the metadata fields are stored in a computing cloud.

4. The method of claim 1, wherein the update alters a displayed appearance of the provided advertisement.

5. The method of claim 1, wherein the update reflects a change in at least one of price, product availability, advertising campaign, awards, landing page URL, offer lifetime, or relative value.

6. The method of claim 1, wherein the update is provided upon determination that the one or more first metadata fields or the one or more first metadata values have changed.

7. The method of claim 1, wherein the update is provided immediately before the provided advertisement is published on a web page.

8. The method of claim 1, wherein the update is provided periodically at a determined interval.

9. The method of claim 1, wherein the metadata value for at least one of the one or more first metadata fields or the one or more second metadata fields is affected by consumer feedback.

10. The method of claim 9, wherein the consumer feedback comprises at least one of user reviews or social media feedback.

11. A system for dynamically updating online advertisements, the system comprising:
a computer device having a processor and a memory; and
one or more computer storage media having hardware storing computer-executable instructions embodied thereon that, when executed by the computer device causes the processor to:
publish on a web page an object-oriented online advertisement that is an instance or subclass of a defined advertisement class,
wherein the object-oriented advertisement has one or more properties inherited from the advertisement class, each of the one or more properties including one or more metadata fields and one or more corresponding metadata values, wherein the one or more properties are grouped into one or more property groups, and wherein the one or more metadata fields and the one or more metadata values inherited from the advertisement class determine a content and appearance of the object-oriented advertisement when published on the web page;
receive a dynamic update to at least one of a metadata field of the one or more metadata fields of the published advertisement or a metadata value corresponding to one of the one or more metadata fields of the published advertisement, the dynamic update inherited from the advertisement class and reflecting a change made to the advertisement class to which the dynamically updated metadata field or metadata value belongs, wherein all instances and subclasses of the advertisement class, including the published advertisement, are updated without having to redesign or replace the published advertisement; and
dynamically update the published advertisement to reflect the change made to the advertisement class.

12. The system of claim 11, wherein at least one of the metadata fields or metadata values are stored in a computing cloud.

13. The system of claim 11, wherein the update alters the displayed appearance of the published advertisement.

14. The system of claim 11, wherein the update reflects a change in at least one of price, product availability, advertising campaign, awards, landing page URL, offer lifetime, or relative value.

15. The system of claim 11, wherein the update is provided upon determination that the metadata value or metadata field has changed.

16. The system of claim 11, wherein the update is provided periodically at a determined interval.

17. The system of claim 11, wherein a metadata value for at least one metadata field is affected by user reviews or social media feedback.

18. A system for dynamically updating online advertisements, the system comprising:

a computer device having a processor and a memory; and
one or more computer storage media comprising hardware having computer-executable instructions embodied thereon that, when executed by a computing device, cause the processor to:

provide an advertisement, the advertisement being a subclass or instance of a defined advertisement class, the advertisement comprising one or more first metadata fields and one or more corresponding first metadata values inherited from the defined advertisement class;

receive data associated specifically with the subclass or instance of the defined advertisement class, the data comprising at least one of: a price, a product information, a product availability, an advertising campaign, an award, a landing page URL, an offer lifetime, or a relative value;

after providing the advertisement, determine at least one of: one or more second metadata fields and one or more corresponding second metadata values based on the data associated specifically with the subclass or instance of the defined advertisement class, wherein each combination of the one or more first or second metadata fields and a corresponding one of the corresponding first or second metadata values comprises a property of the advertisement; and after providing the advertisement, update all instances or subclasses of the defined advertisement class including the provided advertisement based on the determining at least one of: the one or more second metadata fields and the one or more corresponding second metadata values, wherein the determining is based on the data associated specifically with the subclass or instance of the defined advertisement class, wherein the updating is made without having to redesign or replace the provided advertisement, and wherein updating comprises at least one of:

(1) deleting at least one of the one or more first metadata fields responsive to a deletion of the at least one of the one or more first metadata fields from the defined advertisement class, and (2) adding at least one of the one or more second metadata fields responsive to an addition of the at least one of the one or more second metadata fields from the defined advertisement class.

19. The system of claim 18, wherein the metadata values are retrieved from a computing cloud.

20. The system of claim 18, wherein the one or more first metadata fields and the one or more second metadata fields comprise at least one of: ad category, phone number, location, digital signature, age appropriateness, version, lifetime, pointer to dynamic data, one or more activity verifications, user rating, social media feedback, one or more display options, landing page URL, landing page keywords, price, and awards.

* * * * *